United States Patent
Singleton et al.

(10) Patent No.: US 8,917,468 B1
(45) Date of Patent: Dec. 23, 2014

(54) SYSTEMS AND METHODS FOR MEDIA DEFECT DETECTION WITH PATTERN QUALIFICATION

(71) Applicant: LSI Corporation, San Jose, CA (US)

(72) Inventors: Jefferson E. Singleton, Westminster, CO (US); Scott Dziak, Ft. Collins, CO (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/941,472

(22) Filed: Jul. 13, 2013

Related U.S. Application Data

(60) Provisional application No. 61/832,136, filed on Jun. 6, 2013.

(51) Int. Cl.
*G11B 5/09* (2006.01)
*G11B 20/18* (2006.01)

(52) U.S. Cl.
CPC .................................. *G11B 20/182* (2013.01)
USPC ........................................................... 360/48

(58) Field of Classification Search
None
See application file for complete search history.

(56) References Cited

U.S. PATENT DOCUMENTS

| | | | | |
|---|---|---|---|---|
| 4,587,644 | A * | 5/1986 | Fujiie | 369/44.25 |
| 4,688,202 | A * | 8/1987 | Mukai et al. | 369/44.32 |
| 5,502,711 | A * | 3/1996 | Clark et al. | 369/59.17 |
| 5,559,648 | A * | 9/1996 | Hunter et al. | 360/75 |
| 5,802,069 | A | 9/1998 | Coulson | |
| 6,065,149 | A | 5/2000 | Yamanaka | |
| 6,301,679 | B1 | 10/2001 | Tan | |
| 6,446,236 | B1 | 9/2002 | McEwen et al. | |
| 6,557,113 | B1 | 4/2003 | Wallentine | |
| 6,691,263 | B2 | 2/2004 | Vasic et al. | |
| 6,697,977 | B2 | 2/2004 | Ozaki | |
| 6,731,442 | B2 | 5/2004 | Jin et al. | |
| 6,738,948 | B2 | 5/2004 | Dinc et al. | |
| 6,980,382 | B2 | 12/2005 | Hirano et al. | |
| 7,116,611 | B2 * | 10/2006 | Yokoyama | 369/44.35 |
| 7,154,936 | B2 | 12/2006 | Bjerke et al. | |
| 7,168,030 | B2 | 1/2007 | Ariyoshi | |
| 7,203,015 | B2 | 4/2007 | Sakai et al. | |
| 7,237,173 | B2 | 6/2007 | Morita et al. | |

(Continued)

FOREIGN PATENT DOCUMENTS

| | | |
|---|---|---|
| EP | 0549151 | 6/1993 |
| EP | 1096491 | 10/2005 |

(Continued)

OTHER PUBLICATIONS

Bagul "Assessment of current health and remaining useful life of hard disk drives" [online] Jan. 1, 2009 [ret. Oct. 14, 2010] Ret. from internet:<URL;http://iris.lib.neu.edu.

(Continued)

*Primary Examiner* — Peter Vincent Agustin
(74) *Attorney, Agent, or Firm* — Hamilton DeSanctis & Cha

(57) ABSTRACT

An apparatus for detecting media flaws includes an envelope based media defect detector operable to identify a media defect based on an envelope of an input signal, a periodic pattern detector operable to determine whether the input signal comprises a data pattern, and a media flaw signal generation circuit operable to indicate a media defect when the envelope based media defect detector identifies the media defect and the periodic pattern detector determines that the input signal does not comprise the data pattern.

20 Claims, 5 Drawing Sheets

(56) References Cited

U.S. PATENT DOCUMENTS

| | | | |
|---|---|---|---|
| 7,254,192 | B2 | 8/2007 | Onggosanusi |
| 7,257,172 | B2 | 8/2007 | Okamoto et al. |
| 7,359,313 | B2 | 4/2008 | Chan et al. |
| 7,440,208 | B1 * | 10/2008 | McEwen et al. ............... 360/39 |
| 7,441,174 | B2 | 10/2008 | Li et al. |
| 7,457,212 | B2 | 11/2008 | Oh |
| 7,652,966 | B2 | 1/2010 | Kadokawa |
| 7,688,915 | B2 | 3/2010 | Tanrikulu et al. |
| 7,702,973 | B2 | 4/2010 | Mead |
| 7,849,385 | B2 | 12/2010 | Tan |
| 7,852,722 | B2 | 12/2010 | Kikugawa et al. |
| 7,924,518 | B2 | 4/2011 | Mathew |
| 7,952,824 | B2 | 5/2011 | Dziak |
| 8,095,855 | B2 | 1/2012 | Tan |
| 8,121,224 | B2 | 2/2012 | Tan |
| 8,139,457 | B2 | 3/2012 | Cao |
| 8,149,527 | B2 | 4/2012 | Tan |
| 8,161,357 | B2 | 4/2012 | Tan |
| 8,176,400 | B2 | 5/2012 | Tan |
| 8,190,831 | B2 | 5/2012 | Lee et al. |
| 8,201,051 | B2 | 6/2012 | Tan |
| 8,219,892 | B2 | 7/2012 | Tan |
| 8,339,720 | B1 * | 12/2012 | Yang et al. .................... 360/25 |
| 2002/0163326 | A1 * | 11/2002 | Choi et al. .................... 324/113 |
| 2003/0043487 | A1 | 3/2003 | Morita et al. |
| 2003/0058768 | A1 * | 3/2003 | Yokoyama ................. 369/53.18 |
| 2003/0063405 | A1 * | 4/2003 | Jin et al. ......................... 360/31 |
| 2003/0123358 | A1 * | 7/2003 | Kanda et al. ............... 369/53.22 |
| 2007/0061687 | A1 | 3/2007 | Hwang |
| 2008/0168315 | A1 * | 7/2008 | Mead et al. .................... 714/49 |
| 2010/0042877 | A1 | 2/2010 | Tan |
| 2010/0177428 | A1 * | 7/2010 | Oberg ............................. 360/69 |
| 2010/0226031 | A1 * | 9/2010 | Dziak et al. .................... 360/31 |
| 2010/0229031 | A1 | 9/2010 | Tan |
| 2010/0268996 | A1 | 10/2010 | Yang |
| 2010/0269023 | A1 | 10/2010 | Yang |
| 2011/0205653 | A1 | 8/2011 | Mathew |
| 2011/0209026 | A1 | 8/2011 | Xia |
| 2012/0087033 | A1 | 4/2012 | Yang |
| 2012/0254679 | A1 | 10/2012 | Tan |
| 2012/0266055 | A1 | 10/2012 | Zhang |
| 2013/0049997 | A1 * | 2/2013 | Yoshida ......................... 341/50 |

FOREIGN PATENT DOCUMENTS

| | | |
|---|---|---|
| JP | 10-145243 | 5/1998 |
| JP | 2007-087529 | 4/2007 |
| WO | WO 01/39188 | 5/2001 |

OTHER PUBLICATIONS

ECMA: Standardizing Information and Communication Systems: "Standard ECMA-272: 120 mm DVD Rewritable Disk (DVD-RAM)" Standard ECMA, No. 272, pp. 43-51, (Feb. 1998).

Galbraith et al, "Iterative Detection Read Channel Technology in Hard Disk Drives" [online] Oct. 1, 2008 [ret. on Oct. 1, 2008] Ret. from Internet<URL:http://www.hitachigst.com.

Kavcic et al., "A Signal-Dependent Autoregressive Channel Model", IEEE Transactions on Magnetics, vol. 35, No. 5, Sep. 1999 pp. 2316-2318.

U.S. Appl. No. 13/912,109, filed Jun. 6, 2013, Dahua Qin, Unpublished.

U.S. Appl. No. 13/558,228, filed Jul. 25, 2012, Weijun Tan, Unpublished.

U.S. Appl. No. 13/547,516, filed Jul. 12, 2012, Jefferson E. Singleton, Unpublished.

U.S. Appl. No. 13/551,523, filed Jul. 17, 2012, Ming Jin, Unpublished.

U.S. Appl. No. 13/561,243, filed Jul. 30, 2012, Fan Zhang, Unpublished.

U.S. Appl. No. 13/654,417, filed Oct. 18, 2012, Fan Zhang, Unpublished.

U.S. Appl. No. 13/525,194, filed Jun. 15, 2012, Bruce Wilson, Unpublished.

U.S. Appl. No. 13/452,722, filed Apr. 20, 2012, Shaohua Yang, Unpublished.

U.S. Appl. No. 13/459,289, filed Apr. 30, 2012, Fan Zhang, Unpublished.

U.S. Appl. No. 13/213,789, filed Aug. 19, 2011, Ming Jin, Unpublished.

U.S. Appl. No. 13/368,599, filed Feb. 8, 2012, Yang Cao, Unpublished.

* cited by examiner

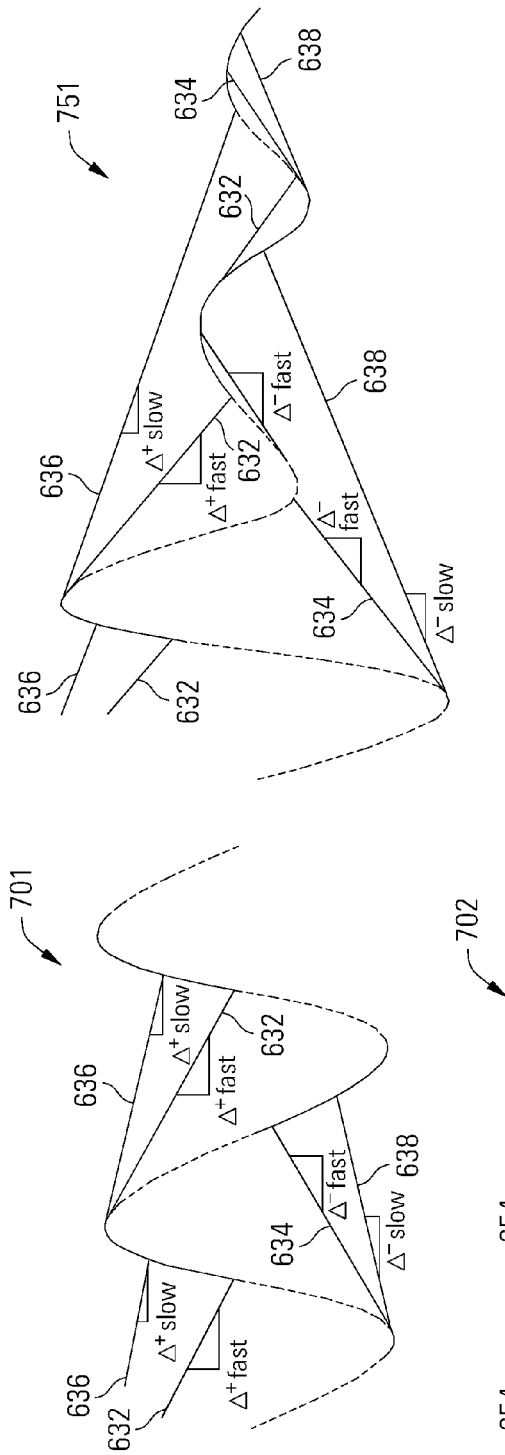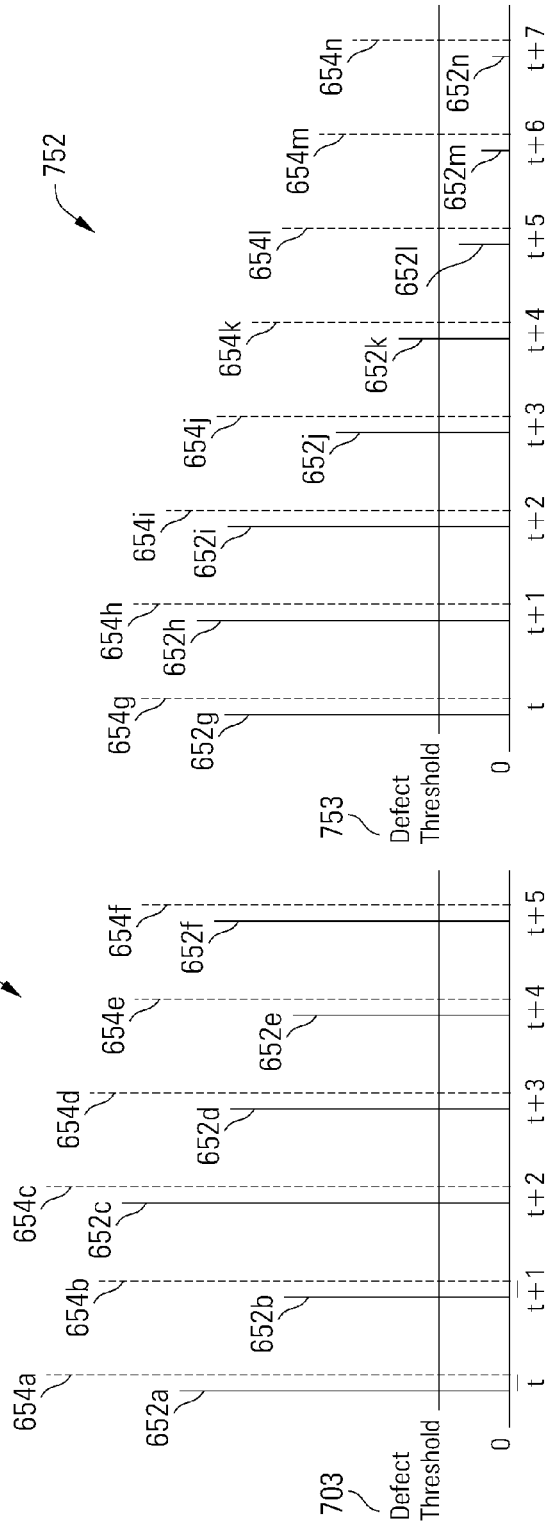
FIG. 7A
FIG. 7B

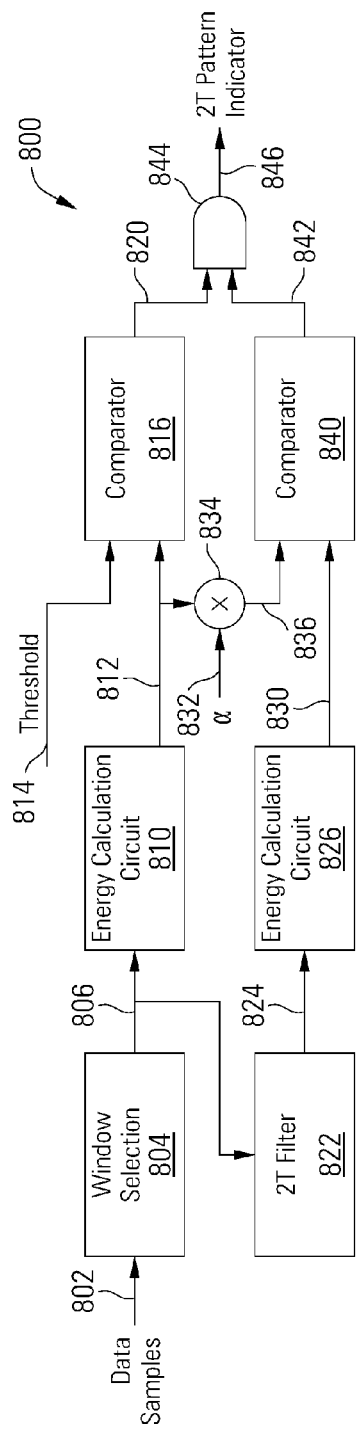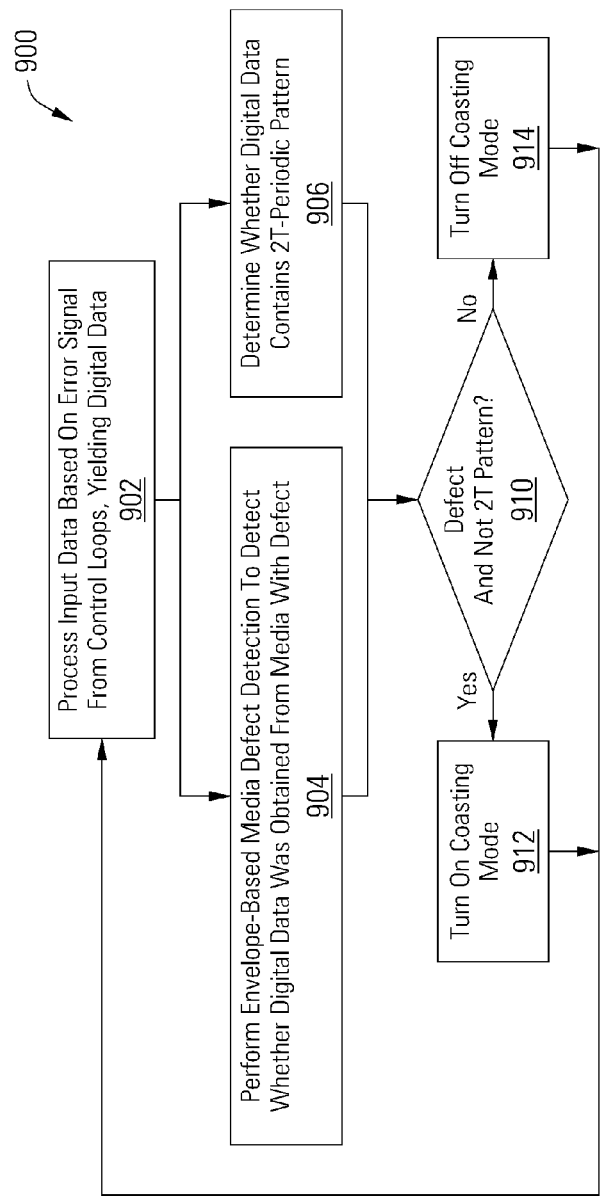
FIG. 8
FIG. 9

SYSTEMS AND METHODS FOR MEDIA DEFECT DETECTION WITH PATTERN QUALIFICATION

CROSS REFERENCE TO RELATED APPLICATIONS

The present application claims priority to (is a non-provisional of) U.S. Pat. App. No. 61/832,136, entitled "Systems and Methods for Media Defect Detection With Pattern Qualification", and filed Jun. 6, 2013 by Singleton et al, the entirety of which is incorporated herein by reference for all purposes.

FIELD OF THE INVENTION

Various embodiments of the present invention provide systems and methods for detecting media flaws, and more particularly to systems and methods for envelope-based defect detection with pattern qualification.

BACKGROUND

In a typical magnetic storage system, digital data is stored in a series of concentric circular tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned anew over the track as the storage medium is rotated. In this position, the previously stored magnetic flux pattern induces a current in the head assembly that can be converted to the previously recorded digital data. Defective regions may exist in the storage medium. Writing data to a defective region can result in the loss of such data. To avoid this, various approaches have been developed for identifying defective regions. However, some of these approaches can yield false positives in some environments, incorrectly identifying a region of the storage medium as defective.

BRIEF SUMMARY

Embodiments of the present invention provide systems and methods for detecting defects on storage media with pattern qualification using a digital data detector in a data processing system.

In some embodiments, an apparatus for detecting media flaws includes an envelope based media defect detector operable to identify a media defect based on an envelope of an input signal, a periodic pattern detector operable to determine whether the input signal comprises a data pattern, and a media flaw signal generation circuit operable to indicate a media defect when the envelope based media defect detector identifies the media defect and the periodic pattern detector determines that the input signal does not comprise the data pattern.

This summary provides only a general outline of some embodiments according to the present invention. Many other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIGS. 7a-7b graphically depict an exemplary operation of the envelope detector of FIG. 6 during data retrieval from both non-defective media regions and defective media regions;

FIG. 8 is a block diagram of a periodic pattern detector that may be used for pattern qualification in an envelope-based defect detector with pattern qualification in accordance with some embodiments of the present invention; and FIG. 9 depicts a flow diagram of an operation for media defect detection with pattern qualification in accordance with some embodiments of the present invention.

DETAILED DESCRIPTION OF THE INVENTION

As data is retrieved from a storage medium such as a magnetic hard disk platter, it is processed by a variety of processing circuits such as analog filters and amplifiers, analog to digital converters, etc. Such processing circuits are controlled by control loops based on feedback in the processing circuits, such as, but not limited to, controlling the sampling phase of an analog to digital converter. In some embodiments, a coasting control loop applies media defect detection to detect media flaws and to place the control loops in a coasting mode when processing data retrieved from a defective media region, to prevent misadaptation of processing circuits based on flawed data. Envelope-based defect detection can be a low-latency alternative to more robust error-based & reliability-based defect detection methods, used in some embodiments to place control loops in coasting mode. However, envelope-based detectors can be tricked by envelope loss associated with narrow-spectrum signals, referred to herein as 2T-periodic patterns, such as but not limited to a repeating "1100" data pattern.

A media defect detector with pattern qualification uses a pattern detector to qualify the results from the envelope-based defect detector to avoid undesired control loop coasting. Thus, the media defect detector with pattern qualification places the control loops in coasting mode when processing data from defective media regions detected by envelope-based detection, but not when processing 2T-periodic patterns which produce the same or similar signal envelopes as data from a defective media region.

The media defect detector with pattern qualification disclosed herein is applicable to processing data stored in or transmitted over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives. For example, the data processing system may be, but is not limited to, a read channel in a magnetic hard disk drive, detecting and decoding data sectors from the drive.

Figure 1:
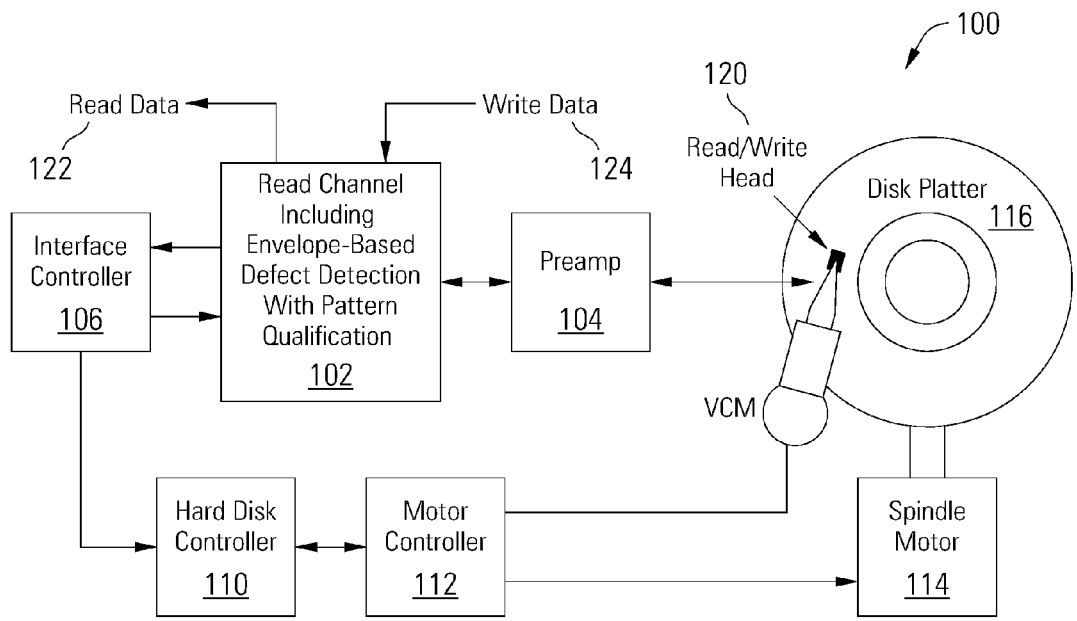
FIG. 1 depicts a storage system including a read channel with envelope-based defect detection with pattern qualification in accordance with some embodiments of the present invention.

Turning to FIG. 1, a storage system 100 is illustrated as an example application of a media defect detector with pattern qualification in accordance with some embodiments of the present invention. The storage system 100 includes a read channel circuit 102 with a media defect detector with pattern qualification, which includes control loops that are placed in coasting mode when processing data from defective media regions detected by envelope-based detection, but not when processing 2T-periodic patterns. Storage system 100 may be, for example, a hard disk drive. Storage system 100 also includes a preamplifier 104, an interface controller 106, a hard disk controller 110, a motor controller 112, a spindle motor 114, a disk platter 116, and a read/write head assembly 120. Interface controller 106 controls addressing and timing of data to/from disk platter 116. The data on disk platter 116 consists of groups of magnetic signals that may be detected by read/write head assembly 120 when the assembly is properly positioned over disk platter 116. In one embodiment, disk platter 116 includes magnetic signals recorded in accordance with either a longitudinal or a perpendicular recording scheme.

In a typical read operation, read/write head assembly 120 is accurately positioned by motor controller 112 over a desired data track on disk platter 116. Motor controller 112 both positions read/write head assembly 120 in relation to disk platter 116 and drives spindle motor 114 by moving read/write head assembly 120 to the proper data track on disk platter 116 under the direction of hard disk controller 110. Spindle motor 114 spins disk platter 116 at a determined spin rate (RPMs). Once read/write head assembly 120 is positioned adjacent the proper data track, magnetic signals representing data on disk platter 116 are sensed by read/write head assembly 120 as disk platter 116 is rotated by spindle motor 114. The sensed magnetic signals are provided as a continuous, minute analog signal representative of the magnetic data on disk platter 116. This minute analog signal is transferred from read/write head assembly 120 to read channel circuit 102 via preamplifier 104. Preamplifier 104 is operable to amplify the minute analog signals accessed from disk platter 116. In turn, read channel circuit 102 decodes and digitizes the received analog signal to recreate the information originally written to disk platter 116. This data is provided as read data 122 to a receiving circuit. As part of processing the received information, read channel circuit 102 performs media defect detection with pattern qualification. In some embodiments, this is performed to correctly place control loops in coasting mode. Such a media defect detector with pattern qualification can be implemented consistent with that disclosed below in relation to FIGS. 5-8. In some cases, the media defect detection with pattern qualification may be performed consistent with the flow diagram disclosed below in relation to FIG. 9. A write operation is substantially the opposite of the preceding read operation with write data 124 being provided to read channel circuit 102. This data is then encoded and written to disk platter 116.

Figure 2:
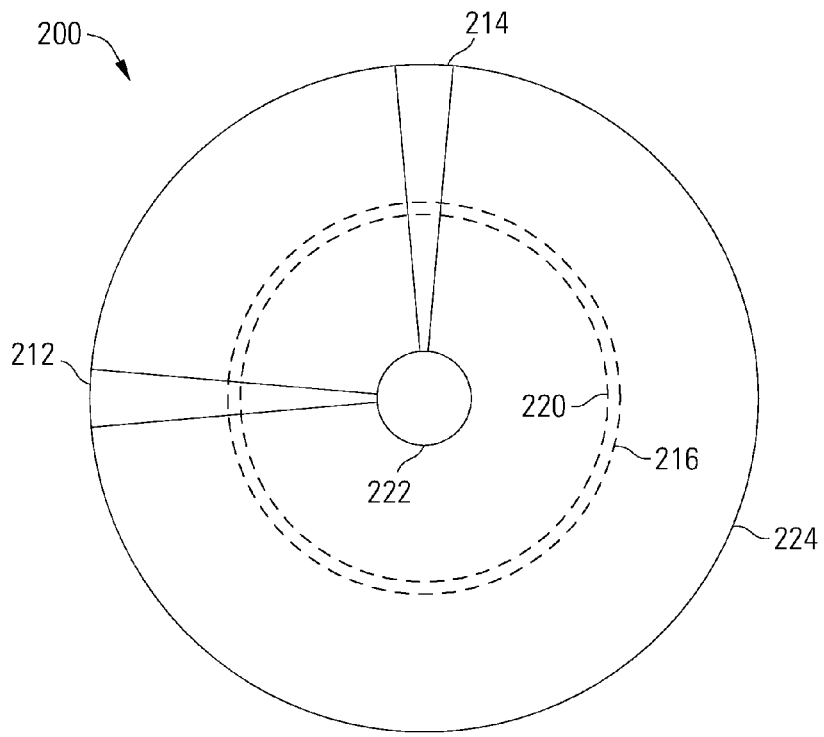
FIG. 2 is a block diagram of a magnetic storage medium that may be scanned for defects using envelope-based defect detection with pattern qualification in accordance with some embodiments of the present invention.

Turning to FIG. 2, a magnetic storage medium 200 with servo wedges (e.g., 212, 214) containing servo data is depicted in accordance with one or more embodiments of the present invention. Two exemplary data tracks 216, 220 are shown, indicated as dashed lines. The tracks 216, 220 are segregated by servo data written within wedges 212, 214.

The servo wedges 212, 214 may extend from an inner diameter 222 to an outer diameter 224, may have any suitable shape and arrangement, and any number of servo wedges may be provided on storage medium 200. It should be noted that while two tracks 216, 220 and two servo wedges 212, 214 are shown, hundreds of wedges and tens of thousands of tracks may be included on a given storage medium.

In operation, storage medium 200 is rotated in relation to a sensor that senses information from the storage medium. In a read operation, the sensor would sense servo data from wedge 112 followed by user data from a user data region between wedge 212 and wedge 214 and then servo data from wedge 214. In a write operation, the sensor would sense servo data from wedge 212 then write data to the user data region between wedge 212 and wedge 214, with location information in the user data region provided by a user sync mark 244 and a user preamble 246. The signal from the sensor is processed by a data processing circuit including a media defect detector with pattern qualification, which can be used to correctly place control loops in coasting mode when reading user data and/or when reading data from some servo data regions.

Figure 3:
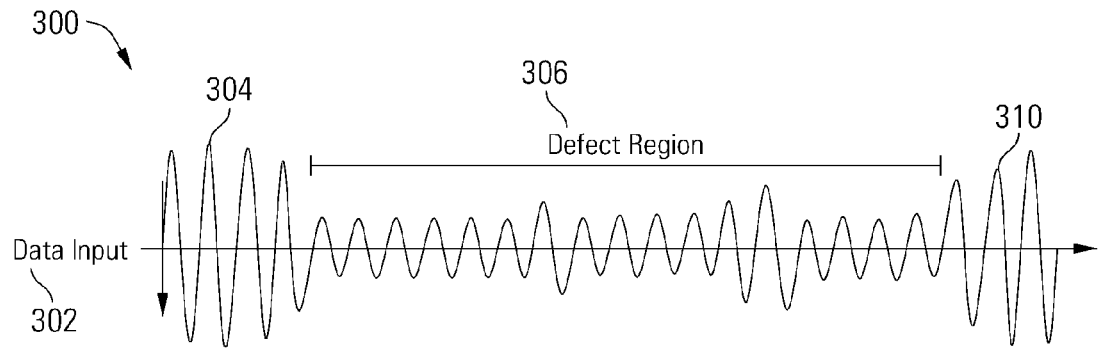
FIG. 3 depicts an exemplary data input signal derived from both defective media regions and non-defective media regions.

Turning to FIG. 3, a timing diagram 300 depicts an exemplary data input signal 302 derived from both defective media regions 306 and non-defective media regions 304, 310. It should be noted that the various data inputs and outputs are merely exemplary and that circuit operation will vary depending upon the particular data inputs and system implementation. Of note, data from the defective portion may include a DC offset that may be eliminated through use of a filter (not shown) as will be appreciated by one of ordinary skill in the art based on the disclosure provided herein. Data from the non-defective medium (portions 304, 310) exhibits a relatively high amplitude when compared with that from the defective medium (portion 306), that is, the envelope is attenuated in the defective media region 306.

Figure 4:
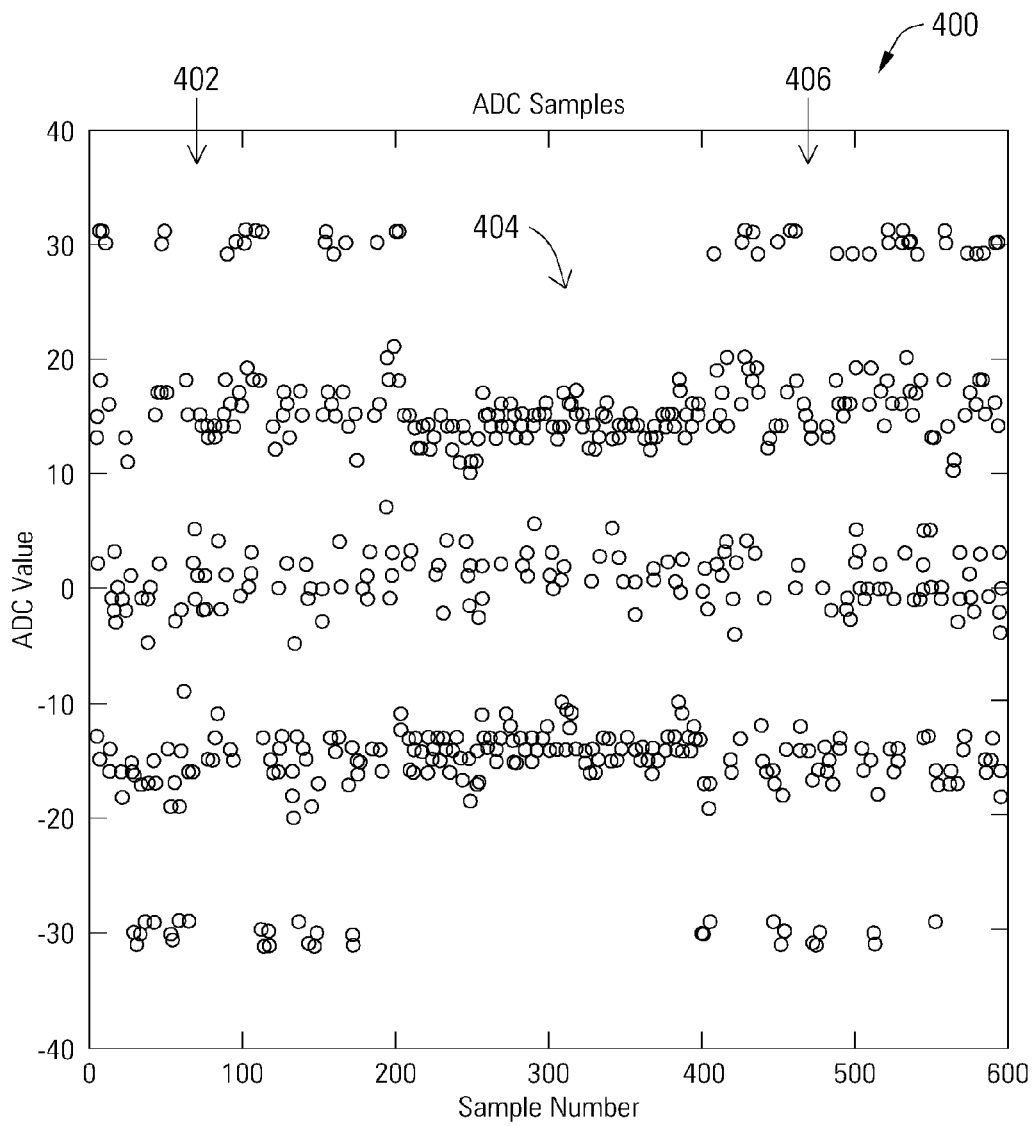
FIG. 4 depicts digital data samples including some from a periodic pattern that exhibits envelope loss.

Turning to FIG. 4, a plot 400 of digital data samples from an analog to digital converter (ADC) illustrates the change in envelope that can result from a 2T-periodic pattern even under ideal conditions. When processing typical random data at regions 402, 406, the data samples produced by the analog to digital converter in some embodiments range in value from about 30 to −32. However, when sampling a 2T-periodic pattern such as, but not limited to, "1100" as at region 404, the envelope is attenuated and the data samples range in value from about 22 to −22. The envelope is attenuated the most when sampling the analog input signal at the shoulders rather than at peaks and zero crossings. Sampling the analog input signal at the shoulders is a valid sampling phase, and the total signal energy remains the same, but the peak amplitude is reduced by about 30% when sampling at the shoulders. Notably, the envelope attenuation shown in FIG. 4 in the 2T-periodic pattern region 404 is similar to or the same as the envelope attenuation shown in the defective media region 306 of FIG. 3, and pattern qualification is used to prevent the media defect detector from placing the control loops in coasting mode when processing the 2T-periodic pattern.

Figure 5:
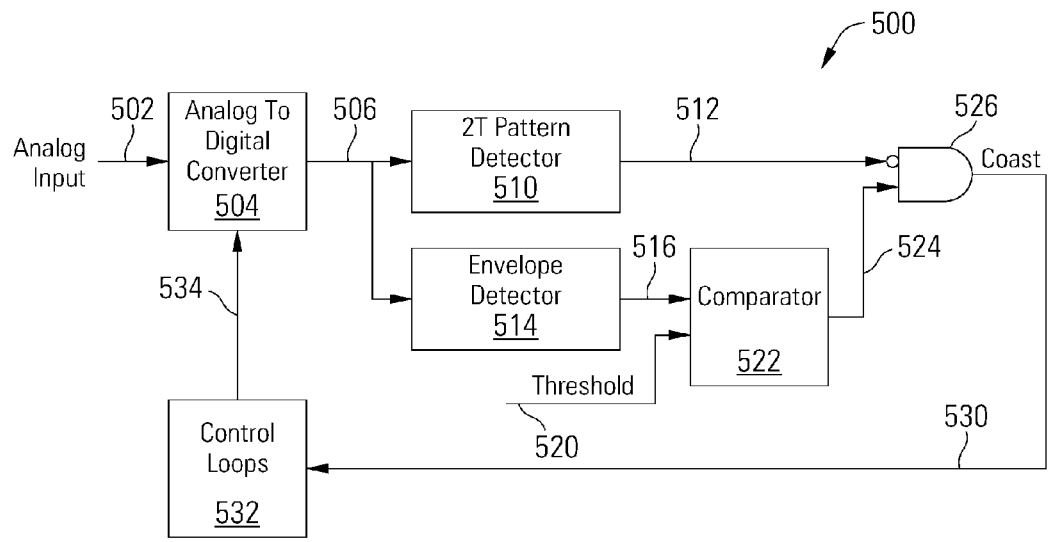
FIG. 5 is a block diagram of a data processing system with coasting control loops and envelope-based defect detection with pattern qualification in accordance with some embodiments of the present invention.

Turning to FIG. 5, a block diagram illustrates a data processing system 500 with coasting control loops 532 and envelope-based media defect detection with pattern qualification in accordance with some embodiments of the present invention. Data processing system 500 includes an analog to digital converter 504 that receives an analog input 502. Analog input 502 may be, but is not limited to, a minute analog electrical signal derived from a read/write head assembly (not shown) that is disposed in relation to a storage medium. Analog input 502 may have also been filtered and amplified by an analog front end circuit (not shown). Based upon the disclosure provided herein, one of ordinary skill in the art will recognize a variety of sources from which analog input 502 may be derived. Analog to digital converter 504 converts analog input 502 into a corresponding series of digital samples 506. Analog to digital converter 504 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention.

Digital samples 506 are provided to an envelope detector 514 which measures the amplitude of the envelope of the digital samples 506 and which yields an envelope amplitude signal 516. The envelope amplitude signal 516 is an averaged signal in some embodiments, giving the envelope amplitude within a time window. The envelope amplitude signal 516 is compared with a threshold 520 in a comparator 522, yielding a media defect error signal 524 when the envelope of the digital samples 506 indicates the presence of a media defect. Based upon the disclosure provided herein, one of ordinary skill in the art will recognize a variety of envelope-based media defect detection circuits that may be used in relation to different embodiments of the present invention. In some embodiments, the envelope detector 514 and comparator 522 are combined in a media defect detection circuit.

The digital samples 506 are also provided to a 2T-periodic pattern detector 510 which determines whether the digital samples 506 correspond with a 2T-periodic pattern such as, but not limited to, "1100". The 2T-periodic pattern detector 510 yields a periodic pattern signal 512 that is asserted when the digital samples 506 correspond with a 2T-periodic pattern. A 2T-periodic pattern may be detected in any suitable manner, such as, but not limited to, based on the signal energy of the digital samples 506. Based upon the disclosure provided herein, one of ordinary skill in the art will recognize a variety of 2T-periodic pattern detector circuits that may be used in relation to different embodiments of the present invention.

The media defect error signal 524 and the periodic pattern signal 512 are combined in a combining circuit 526 such as an AND gate with an inverting input, yielding a coast signal 530 that is asserted when the envelope detector 514 detects a media defect and the 2T-periodic pattern detector 510 confirms that the diminished envelope of the digital samples 506 is not due to a 2T-periodic pattern.

The coast signal 530 is provided to adaptive control loops 532, which generate an error signal 534 provided to the analog to digital converter 504 and/or analog front end (not shown), facilitating correction of phase and frequency sampling errors, gain, etc. In some embodiments, control loops 532 include three adaptive feedback loops. The first loop includes a digital phase lock loop circuit and is operable to adaptively adjust the sampling period used by analog to digital converter 504 to sample analog input 502 (i.e., adjusting the phase and/or frequency of a clock signal). The second loop includes an offset circuit (not shown) that is used to adaptively adjust any DC offset from the received analog input. The third loop includes a gain calculation circuit (not shown) that is used to adaptively adjust the gain used in pre-processing the received analog input signal. When analog input 502 includes a media defect region such as that depicted in FIG. 3, the operation of the feedback loops is harmful to the system operation. In particular, when analog input 502 is derived from the defect region, a large number of errors in an ideal output compared to digital samples 506 will be expected resulting in a dramatic increase in the magnitude of an error signal 534 generated by control loops 532. While this error result is not adaptively correctable due to the defective media, each of the three feedback loops will generate an output seeking to adaptively correct the error. This potentially results in an unnecessary circuit oscillation. Such circuit oscillation is prevented by the coast signal 530 which places the control loops 532 in coasting mode, either zeroing out the error signal 534 or causing the analog to digital converter 504 and any other elements such as, but not limited to, an analog front end (not shown) to ignore incoming error signals (e.g., 534) from the control loops 532 while in coasting mode.

Figure 6:
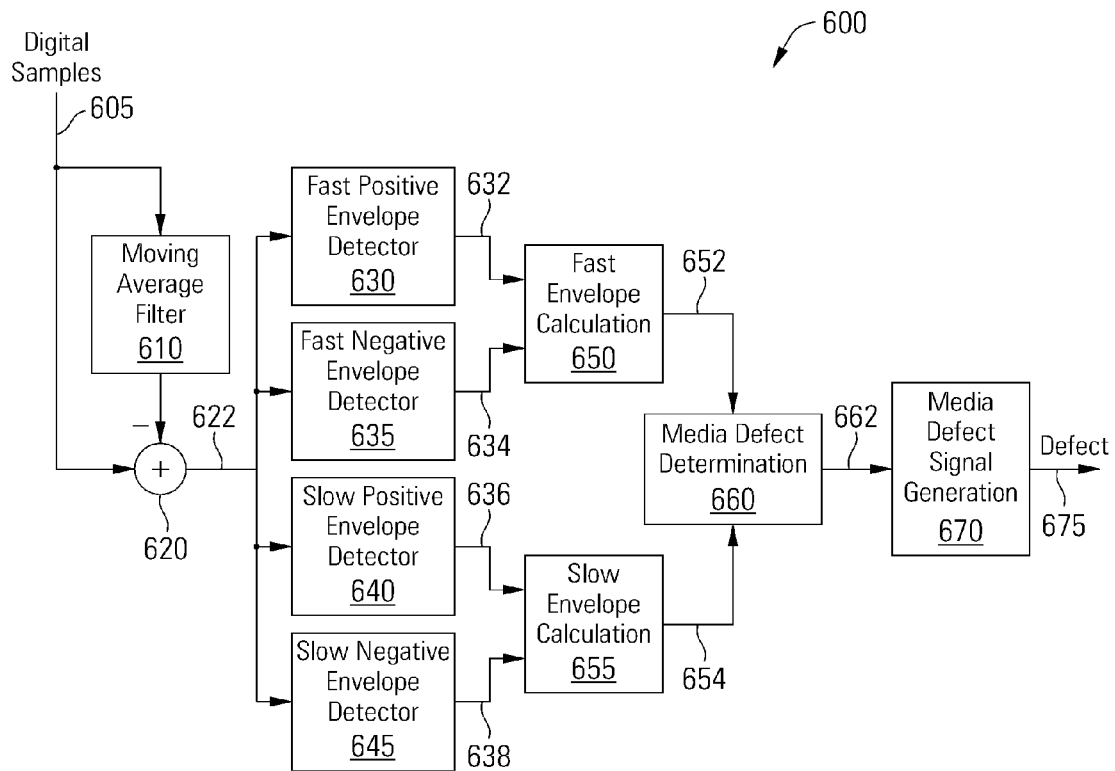
FIG. 6 depicts an envelope detector that may be used in an envelope-based defect detector with pattern qualification in accordance with some embodiments of the present invention.

Turning to FIG. 6, an envelope-based media defect detector circuit 600 is shown in accordance with one or more embodiments of the present invention. This and other embodiments of an envelope-based media defect detector which may be used in place of envelope detector 514 are disclosed in U.S. Pat. No. 8,139,457, issued Mar. 20, 2012 for "Systems And Methods For Low Latency Media Defect Detection", which is incorporated herein for all purposes. Media defect detector circuit 600 includes a moving average filter circuit 610. A signal received from a defective region of a medium often exhibits a significant DC shift. Maintaining a moving average of the received digital samples 605, and subtracting the resulting average from the current digital samples operates to combat any DC shift occurring in relation to a defective medium region. Moving average filter circuit 610 includes the ability to average digital samples 605 across a large enough period to assure that the output of moving average filter circuit 610 adequately represents any DC offset in the received signal. In some embodiments of the present invention, samples for five or more bit periods are averaged at a time, with the oldest value of digital samples 605 being replaced by the most recent value of digital samples 605.

The resulting moving average from moving average filter circuit 610 is subtracted from the current value of digital samples 605 using a summation element. This subtraction yields a substantially DC free sample value at the output of summation element 620. An output 622 from summation element 620 is provided in parallel to four separate envelope detector circuits: a fast positive envelope detector circuit 630, a fast negative envelope detector circuit 635, a slow positive envelope detector circuit 640, and a slow negative envelope detector circuit 645. Fast positive envelope detector circuit 630 applies the following algorithm to output 622:

$$e^+_{fast}(k+1) = \max\{x_k, e^+_{fast}(k) - \Delta^+_{fast}\},$$

where $x_k$ indicates a prior value of output 622, $e^+_{fast}(k)$ indicates a prior value of an output 632 of fast positive envelope detector 630, $e^+_{fast}(k+1)$ indicates the next value of output 632, and $\Delta^+_{fast}$ indicates a fast decay rate. Fast negative envelope detector circuit 635 applies the following algorithm to output 622:

$$e^-_{fast}(k+1) = \min\{x_k, e^-_{fast}(k) + \Delta^-_{fast}\},$$

where $e^-_{fast}(k)$ indicates a prior value of an output 634 of fast negative envelope detector 635, $e^-_{fast}(k+1)$ indicates the next value of output 634, and $\Delta^-_{fast}$ indicates the same fast decay rate of $\Delta^+_{fast}$. Slow positive envelope detector circuit 640 applies the following algorithm to output 622:

$$e^+_{slow}(k+1)=\max\{x_k, e^+_{slow}(k)-\Delta^-_{slow}\},$$

where $e^+_{slow}(k)$ indicates a prior value of an output 636 of slow positive envelope detector 640, $e^+_{slow}(k+1)$ indicates the next value of output 636, and $\Delta^+_{slow}$ indicates a slow decay rate that is less than fast decay rate, $\Delta^+_{fast}$. Slow negative envelope detector circuit 645 applies the following algorithm to output 622:

$$e^-_{slow}(k+1)=\min\{x_k, e^-_{slow}(k)+\Delta^-_{slow}\},$$

where $e^-_{slow}(k)$ indicates a prior value of an output 638 of slow negative envelope detector 645, $e^-_{slow}(k+1)$ indicates the next value of output 638, and $\Delta^-_{slow}$ indicates the same slow decay rate $\Delta^+_{slow}$. It should be noted, however, that the decay rates for the negative and positive envelope calculations do not need to be the same.

Outputs 632, 634 are each provided to a fast envelope calculation circuit 650, and outputs 636, 638 are each provided to a slow envelope calculation circuit 655. Fast envelope calculation circuit 650 provides an output 652 described by the following equation:

$$e_{fast}(k+1)=e^+_{fast}(k+1)-e^-_{fast}(k+1).$$

Similarly, slow envelope calculation circuit 655 provides an output 654 described by the following equation:

$$e_{slow}(k+1)=e^+_{slow}(k+1)-e^-_{slow}(k+1).$$

Outputs 652, 654 are each provided to a media defect determination circuit 660 that combines the values of the outputs for comparison against a threshold to determine whether a media defect is detected. Media defect determination circuit 660 provides an output 662 defined by the following equation:

$$\text{Defect Ratio} = \frac{e_{fast}}{e_{slow}}.$$

Where the defect ratio is greater than a defined threshold, output 662 is asserted. Output 662 is provided to a media defect signal generation circuit 670 that is operable to control the immediacy of an assertion of a defect output 675 and the duration of the assertion. In some embodiments of the present invention, media defect signal generation circuit 670 includes a re-settable/re-loadable counter that counts the number of periods after the media defect region is cleared. In such cases, defect output 675 may remain asserted until the counter reaches a defined count value.

FIG. 7a graphically depicts an exemplary operation of media defect detector 600 during data retrieval from a non-defective media region. A timing diagram 701 shows output 622 as a cyclical signal with a reasonably consistent amplitude as would be expected when data is being retrieved from a non-defective region of a medium. As shown, the value of $e^+_{fast}$ (output 632) changes by an amount ($\Delta^+_{fast}$) that is slower than the rate at which output 622 decreases. Output 632 assumes the value of output 622 or of the value degraded by $\Delta^+_{fast}$ depending upon whichever is greater in accordance with the following equation:

$$e^+_{fast}(k+1)=\max\{x_k, e^+_{fast}(k)-\Delta^+_{fast}\}.$$

The value of $e^-_{fast}$ (output 634) changes by an amount ($\Delta^-_{fast}$) that is slower than the rate at which output 622 increases. Output 634 assumes the value of output 622 or of the value degraded by $\Delta^-_{fast}$ depending upon whichever is less in accordance with the following equation:

$$e^-_{fast}(k+1)=\min\{x_k, e^-_{fast}(k)+\Delta^-_{fast}\}.$$

The value of $e^+_{slow}$ (output 636) changes by an amount ($\Delta^+_{slow}$) that is slower than the rate at which output 622 decreases. Output 636 assumes the value of output 622 or of the value degraded by $\Delta^+_{slow}$ depending upon whichever is greater in accordance with the following equation:

$$e^+_{slow}(k+1)=\max\{x_k, e^+_{slow}(k)-\Delta^+_{slow}\}.$$

The value of $e^-_{slow}$ (output 638) changes by an amount ($\Delta^-_{slow}$) that is slower than the rate at which output 622 increases. Output 638 assumes the value of output 622 or of the value degraded by $\Delta^-_{slow}$ depending upon whichever is less in accordance with the following equation:

$$e^-_{slow}(k+1)=\min\{x_k, e^-_{slow}(k)+\Delta^-_{slow}\}.$$

A timing diagram 702 depicts the values of $e_{fast}$ (output 652 shown as solid lines) and $e_{slow}$ (output 654 shown as dashed lines) at different calculation periods (t, t+1, t+2, . . . ). As discussed above, outputs 652, 654 respectively correspond to the following equations:

$$e_{fast}(k+1)=e^+_{fast}(k+1)-e^-_{fast}(k+1), \text{ and}$$

$$e_{slow}(k+1)=e^+_{slow}(k+1)-e^-_{slow}(k+1).$$

Of note, the values of outputs 652, 654 are reasonably constant over the calculation periods, and at all times exceed a defect threshold value 703. Further, the ratio of output 652 to output 654 remains reasonably constant over the depicted period. As the ratio at all times exceeds a defect threshold value 703, a defect is not indicated, and thus defect output 675 remains deasserted. This situation is expected where the received data is not derived from a defective region of the media.

FIG. 7b graphically depicts an exemplary operation of media defect detector 600 during data retrieval during a transition from a non-defective media region to a defective media region.

A timing diagram 751 shows output 622 as a cyclical signal with a degrading amplitude representing the transition to a defective region of the media from which the data is derived. As shown, the value of $e^+_{fast}$ (output 632) changes by an amount $\Delta^+_{fast}$) that is slower than the rate at which output 622 decreases. Output 632 assumes the value of output 622 or of the value degraded by $\Delta^+_{fast}$ depending upon whichever is greater. The value of $e^-_{fast}$ (output 634) changes by an amount ($\Delta^-_{fast}$) that is slower than the rate at which output 622 increases. Output 634 assumes the value of output 622 or of the value degraded by $\Delta^-_{fast}$ depending upon whichever is greater. The value of $e^+_{slow}$ (output 636) changes by an amount ($\Delta^+_{slow}$) that is slower than the rate at which output 622 decreases. Output 636 assumes the value of output 622 or of the value degraded by $\Delta^+_{slow}$ depending upon whichever is greater. The value of $e^-_{slow}$ (output 638) changes by an amount ($\Delta^-_{slow}$) that is slower than the rate at which output 622 increases. Output 638 assumes the value of output 622 or of the value degraded by $\Delta^-_{slow}$ depending upon whichever is greater.

A timing diagram 752 depicts the values of $e_{fast}$ (output 652 shown as solid lines) and $e_{slow}$ (output 654 shown as dashed lines) at different calculation periods (t, t+1, t+2, . . . ). Of note, the values of outputs 652, 654 continue to decrease as the transition from the non-defective media region to the defective media region occurs. Further, the ratio of output 652 to output 654 declines dramatically between calculation period t+2 and calculation period t+3. Once this ratio falls below a defect threshold value 753, a defect is indicated. At this point, defect output 675 is asserted. It should be noted that in some embodiments of the present invention the threshold must be exceeded for a certain number of consecutive calculation periods before defect output 675 is asserted. Such an approach operates to filter out any spurious noise that is not necessarily indicative of a defective medium. Based on the disclosure provided herein, one of ordinary skill in the art will recognize a variety of filters and/or filtering techniques that may be used in relation to different embodiments of the present invention to assure a more accurate designation of the media defect output.

It should be noted that transition from a defective media region to a non-defective media region is substantially the reverse of that shown in FIG. 7b. In such a case, once the ratio of output 654 to output 652 exceeds defect threshold 753, defect output 675 is again deasserted. In some cases, deassertion of defect output may be delayed for a defined period or for a certain number of consecutive calculation periods where the ratio exceeds defect threshold 753. Such an approach operates to filter out any spurious noise that is not necessarily indicative of the end of a defect region. Based on the disclosure provided herein, one of ordinary skill in the art will recognize a variety of filters and/or filtering techniques that may be used in relation to different embodiments of the present invention to assure a more accurate designation of the media defect output.

Turning to FIG. 8, a periodic pattern detector 800 is disclosed that may be used in place of 2T-periodic pattern detector 510 for pattern qualification in an envelope-based media defect detector in accordance with some embodiments of the present invention. In some embodiments, the 2T-periodic pattern detection is based on spectral energy, calculating the total energy of the signal at the 2T frequency and comparing that against the total energy of the signal. For a 2T-periodic pattern, the energy at the 2T frequency will be a substantial percentage of the total energy of the signal. Because there will typically be some noise in the signal, even data samples containing only a repeating "1100" pattern will contain some energy outside of the 2T frequency, and a threshold is used to establish the percentage of energy at the 2T frequency which the signal should contain to indicate that the data contains or consists of a 2T-periodic pattern. The level of the threshold may be established based on expected channel conditions and the desired balance between active adaptation of the control loops in the possible presence of errors and coasting in the possible presence of 2T-periodic patterns simulating a non-existent media defect.

Data samples 802 are provided to a window selection circuit 804 which yield data samples 806 within a window of time. The length of within which the window selection circuit 804 selects samples may be adapted to any desired duration, such as, but not limited to, 12 or 16 bits. The selected data samples 806 are provided to an energy calculation circuit 810, which calculates the sum of the square of the values of the selected data samples 806 ($\Sigma x^2$, where x are the values of the data samples 806), yielding the total energy in the signal 812. The total energy in the signal 812 is compared with a threshold 814 in a comparator 816, yielding a minimum signal energy signal 820 that is asserted when the total energy in the signal 812 is greater than the threshold 814. This prevents the periodic pattern detector 800 from finding a 2T-periodic pattern when the overall signal energy is too low or nonexistent.

The selected data samples 806 are also provided to a bandpass filter 822 that operates at the 2T frequency, yielding filtered samples 824 at the 2T frequency. The bandpass filter 822 effectively correlates the selected data samples 806 against a 2T pattern to determine the amount of 2T energy in the selected data samples 806. In some embodiments, the bandpass filter 822 performs a Discrete Fourier Transform. The filtered samples 824 are provided to an energy calculation circuit 826 which performs the same function as the energy calculation circuit 810, yielding the total amount of 2T energy in the signal 830. The energy calculation circuit 826 calculates the sum of the square of the values of the filtered samples 824 ($\Sigma x_{2T}^2$, where $x_{2T}$ are the values of the filtered samples 824).

The total amount of 2T energy in the signal 830 is compared with a scaled version 836 of the total energy in the signal 812 in comparator 840, yielding an intermediate 2T pattern indicator 842 that is asserted when a 2T-periodic pattern is detected. The total energy in the signal 812 is scaled by a scaling factor $\alpha$ 832 in multiplier 834, yielding scaled total energy in the signal 836. The scaling factor $\alpha$ 832 establishes the threshold that determines how much of the total energy in the signal must be at the 2T frequency to identify a 2T-periodic pattern. The bandpass filter 822, energy calculation circuits 810, scaling factor $\alpha$ 832 and comparator 840 implement the following equation, where a 2T-periodic pattern is identified when the comparison holds true:

$$\Sigma x_{2T}^2 > \alpha \Sigma x^2$$

where $\Sigma x_{2T}^2$ is the total amount of 2T energy in the signal 830, and $\alpha \Sigma x^2$ is the scaled total energy in the signal 836.

The intermediate 2T pattern indicator 842 is combined with the minimum signal energy signal 820 in AND gate 844, yielding a 2T pattern indicator 842 that is asserted when a 2T-periodic pattern is identified in the selected data samples 806 and when the total energy in the signal 812 is greater than threshold 814.

Turning to FIG. 9, a flow diagram 900 depicts a method for control loop coasting using envelope-based media defect detection with pattern qualification in accordance with some embodiments of the present invention. The method of FIG. 9, or variations thereof, may be performed in data processing systems such as those disclosed in FIGS. 5-8. Following flow diagram 900, input data is processed based on error signals from control loops, yielding digital data. (Block 902) In various embodiments, the error signals correct parameters such as, but not limited to, sampling phase and frequency, gain, DC offset, etc. The error signals are disabled when operating in a coasting mode, so that data processing does not attempt to adapt to error signals generated from data retrieved from media defect regions. Envelope-based media defect detection is performed to detect whether the digital data was obtained from a defective media region. (Block 904) In parallel with the media defect detection, it is determined whether the digital data contains a 2T-periodic pattern. (Block 906) A determination is made as to whether the digital data was obtained from a defective media region, and does not contain a 2T pattern. (Block 910) If so, the system is placed in coasting mode. (Block 912) If the envelope-based media defect detection did not detect a defect or if the 2T-periodic pattern detection determined that the digital data was a 2T-periodic pattern, coasting mode is turned off. (Block 914)

It should be noted that the various blocks discussed in the above application may be implemented in integrated circuits along with other functionality. Such integrated circuits may include all of the functions of a given block, system or circuit, or a portion of the functions of the block, system or circuit.

Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, embodiments of the present invention provide novel systems, devices, methods and arrangements for media defect detection with pattern qualification. While detailed descriptions of one or more embodiments of the invention have been given above, various alternatives, modifications, and equivalents will be apparent to those skilled in the art without varying from the spirit of the invention. Therefore, the above description should not be taken as limiting the scope of embodiments of the invention which are encompassed by the appended claims.

What is claimed is:

1. An apparatus for detecting media flaws, comprising:
   an envelope based media defect detector operable to identify a media defect based on an envelope of an input signal;
   a periodic pattern detector operable to determine whether the input signal comprises a data pattern; and
   a media flaw signal generation circuit operable to indicate a media defect when the envelope based media defect detector identifies the media defect and the periodic pattern detector determines that the input signal does not comprise the data pattern, wherein the periodic pattern detector is operable to indicate that the input signal comprises the data pattern when a level of energy at a frequency of the data pattern in the input signal is greater than a percentage of a total energy of the input signal.

2. The apparatus of claim 1, further comprising at least one control loop operable to control at least one processor that is operable to process the input signal.

3. The apparatus of claim 2, wherein the media flaw signal generation circuit comprises a coast signal generator operable to assert a coast signal when the envelope based media defect detector identifies the media defect and the periodic pattern detector determines that the input signal does not comprise the data pattern.

4. The apparatus of claim 3, wherein the at least one control loop does not actively control the at least one processor when the coast signal is asserted.

5. The apparatus of claim 2, wherein the at least one processor comprises an analog to digital converter.

6. The apparatus of claim 1, wherein the data pattern comprises a "1100" pattern.

7. The apparatus of claim 1, wherein the periodic pattern detector is operable to determine whether the input signal comprises the data pattern based on a total energy of the input signal compared to a level of the energy of the data pattern in the input signal.

8. The apparatus of claim 1, wherein the periodic pattern detector is further operable to indicate that the input signal comprises the data pattern only when the total energy of the input signal is greater than a threshold value.

9. The apparatus of claim 1, the periodic pattern detector comprising:
   a window circuit operable to select a plurality of samples from the input signal within a sample window;
   a sum of the squares calculator operable to calculate the sum of the squares of the plurality of samples to yield a total energy value for the plurality of samples;
   a filter operable to pass the plurality of samples at a frequency of the data pattern to yield filtered samples;
   a second sum of the squares calculator operable to calculate the sum of the squares of the filtered samples to yield an energy value at the frequency of the data pattern for the plurality of samples; and
   a comparator operable to compare the energy value at the frequency of the data pattern with the total energy value.

10. The apparatus of claim 9, further comprising a scaling circuit operable to scale the total energy value before compare the energy value at the frequency of the data pattern with a scaled version of the total energy value.

11. The apparatus of claim 9, further comprising a second comparator operable to compare the total energy value with a threshold value.

12. The apparatus of claim 1, wherein the apparatus is implemented as an integrated circuit.

13. The apparatus of claim 1, wherein the apparatus is incorporated in a magnetic storage device and is operable to detect flaws on the storage medium in the magnetic storage device.

14. The apparatus of claim 13, wherein the apparatus is operable to place a control loop in a coasting mode when the envelope based media defect detector identifies the media defect and the periodic pattern detector determines that the input signal does not comprise the data pattern.

15. A method of detecting media flaws, comprising:
    processing input data based on an error signal from a control loop to yield data samples;
    performing envelope-based media defect detection to detect whether the data samples were obtained from media with a defect;
    determining whether the data samples comprise a periodic data pattern that would cause an error in the envelope-based media defect detection, wherein the envelope-based media defect detection detects when an envelope of the data samples is attenuated, and wherein sampling the periodic data pattern in the input data in an analog to digital converter also causes an attenuation of the envelope of the data samples; and
    causing the control loop to coast when the envelope-based media defect detection detects that the data samples were obtained from media with a defect and the data samples do not comprise the periodic data pattern.

16. The method of claim 15, wherein determining the data samples comprise a periodic data pattern comprises determining whether an energy level of the data samples at a frequency of the periodic data pattern exceeds a percentage of a total energy of the data samples.

17. The method of claim 16, wherein determining the data samples comprise a periodic data pattern further comprises determining that the total energy of the data samples is greater than a threshold.

18. A storage system comprising:
    a storage medium;
    a read/write head assembly operable to read data on the storage medium and to yield an analog signal;
    an analog to digital converter operable to generate data samples representing the analog signal;
    a control loop operable to generate an error signal to adjust the analog to digital converter;

an envelope based media defect detector operable to identify a media defect based on an envelope of the data samples;

a periodic pattern detector operable to determine whether the data samples comprise a periodic data pattern that would cause an incorrect result in the envelope based media defect detector, wherein the periodic pattern detector is operable to indicate that the data samples comprise the data pattern when a level of energy at a frequency of the data pattern in the data samples is greater than a percentage of a total energy of the data samples; and a coast signal generation circuit operable to cause the control loop to coast when the envelope based media defect detector identifies the media defect and the periodic pattern detector determines that the data samples do not comprise the periodic data pattern.

19. The storage system of claim 18, wherein the envelope-based media defect detector is operable to detect when an envelope of the data samples is attenuated, and wherein sampling the periodic data pattern in the data samples in the analog to digital converter also causes an attenuation of the envelope of the data samples.

20. The storage system of claim 18, wherein the periodic pattern detector is further operable to indicate that the data samples comprise the data pattern only when the total energy of the data samples is greater than a threshold value.

\* \* \* \* \*